(12) United States Patent
Nichols et al.

(10) Patent No.: US 8,010,245 B2
(45) Date of Patent: Aug. 30, 2011

(54) AIRCRAFT SYSTEMS AND METHODS FOR DISPLAYING A TOUCHDOWN POINT

(75) Inventors: Troy Nichols, Peoria, AZ (US); Michael C. Little, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 420 days.

(21) Appl. No.: 12/241,477

(22) Filed: Sep. 30, 2008

(65) Prior Publication Data

US 2010/0082187 A1 Apr. 1, 2010

(51) Int. Cl.
*G06F 19/00* (2006.01)
*G06G 7/70* (2006.01)
(52) U.S. Cl. ............ 701/16; 701/18; 340/953; 340/955; 340/972
(58) Field of Classification Search .................. 701/3, 4, 701/5, 14, 16, 18; 73/178 R, 178 T; 340/947, 340/948, 951–956, 960–961, 972, 973, 980, 945
See application file for complete search history.

(56) References Cited

U.S. PATENT DOCUMENTS

| | | | | |
|---|---|---|---|---|
| 3,521,228 A * | 7/1970 | Izumi et al. | ................... | 340/973 |
| 3,789,356 A * | 1/1974 | Harenberg et al. | ............ | 340/972 |
| 4,368,517 A * | 1/1983 | Lovering | ......................... | 701/16 |
| 5,343,395 A * | 8/1994 | Watts | ............................. | 701/16 |
| 6,711,479 B1 * | 3/2004 | Staggs | ............................ | 701/16 |
| 2008/0162092 A1 * | 7/2008 | Coulmeau et al. | ................ | 703/2 |

* cited by examiner

*Primary Examiner* — Jack Keith
*Assistant Examiner* — Rami Khatib
(74) *Attorney, Agent, or Firm* — Ingrassia Fisher & Lorenz, P.C.

(57) ABSTRACT

A display system for an aircraft includes a processing unit configured to determine a touchdown point for the aircraft and to supply display commands associated with the touchdown point; and a display device coupled the processing unit and configured to receive the display commands and operable to render symbology representing the touchdown point.

17 Claims, 3 Drawing Sheets

AIRCRAFT SYSTEMS AND METHODS FOR DISPLAYING A TOUCHDOWN POINT

TECHNICAL FIELD

The present invention generally relates to aircraft systems and methods, and more particularly, to aircraft systems and methods for displaying a touchdown point during a landing situation.

BACKGROUND

Landing is one of the most demanding tasks in flying. During a landing situation, the aircraft should be brought to a safe and complete stop within a given runway distance. Typically, a pilot will look out the cockpit window and attempt to intuitively estimate a point at which the aircraft landing gear will touch the ground, which is referred to herein as the "touchdown point." The aircraft usually approaches the runway at a pitch angle such that the rear wheels of the landing gear touch down first. Since the pilot is typically relatively removed from the rear wheels of the landing gear, estimating the exact touchdown point may be a challenge in some circumstances. If the pilot does not accurately estimate the touchdown point, the aircraft could potentially touchdown too hard, or land at an undesirable location.

Low visibility may further complicate landing since the pilot typically loses his natural ability to orient himself and the aircraft to external stimuli under such circumstances, e.g., a natural horizon may not be visible. Without visual orientation stimuli through the window, the pilot cannot define or affirm his positional or attitudinal situation. In these situations, the pilot continually monitors the instruments, including a Flight Path Marker and a number of other dials, gauges, displays, readouts and needles. Even a seasoned pilot typically requires several seconds to scan the complex instrumentation in the aircraft. With the specific information gleaned from each instrument, the pilot synthesizes the information to form an instantaneous composite mental picture of the aircraft approach.

Computer generated aircraft displays have become highly sophisticated and capable of displaying a substantial amount of flight management, navigation, and control information that gives flight crews more effective control of the aircraft and a reduction in workload during a normal flight situation and/or a low visibility, instrument situation. In this regard, electronic displays, such as Heads-Up Displays (HUDs) and Heads-Down Displays (HDDs), are used in aircraft as primary flight displays. For example, the primary flight display can combine critical flight instrumentation (e.g., altitude, attitude, heading, airspeed, vertical speed instruments) and primary engine instrument indicators into a single, readily interpretable display.

Although conventional primary flight displays may provide some assistance to the pilot during normal and instrument situations, they are typically not as helpful during landing situations. Conventional primary flight displays may include a flight path vector that displays the direction in which the aircraft is traveling, and thus, the location at which the aircraft appears to intersect with the runway. However, the flight path vector is usually referenced from the users point of view and may not provide an accurate indication of the touchdown point of the rear wheels of the landing gear.

Accordingly, it is desirable to provide systems and methods that display the touchdown point of an aircraft during a landing situation. Additionally, it is desirable to provide systems and methods for enhancing the safety of aircraft instrument landings. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a display system for an aircraft includes a processing unit configured to determine a touchdown point for the aircraft and to supply display commands associated with the touchdown point; and a display device coupled the processing unit and configured to receive the display commands and operable to render symbology representing the touchdown point.

In accordance with another exemplary embodiment, a method of displaying symbology related to a runway includes presenting a 3D perspective view of the runway; determining a touchdown point of the aircraft on the runway; and displaying the touchdown point on the 3D perspective of the runway.

In accordance with yet another exemplary embodiment, a display system for an aircraft with rear wheels includes a processing unit configured to determine a touchdown point for the aircraft in an landing situation on a runway and to supply display commands associated with the touchdown point and the runway; and a display device coupled the processing unit and configured to receive the display commands and operable to render symbology representing the touchdown point and runway in a 3D, synthetic view, the touchdown point being rendered as a bar extending across the runway and in a different color than the runway, the touchdown point further being rendered as a point at which the rear wheels touch the runway.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments described herein provide visual display systems and methods for aircraft. More specifically, the visual display systems and methods display images that represent the touchdown point of the aircraft during a landing situation. The touchdown point can be provided on a primary flight display and is particularly useful during an instrument landing.

Figure 1:
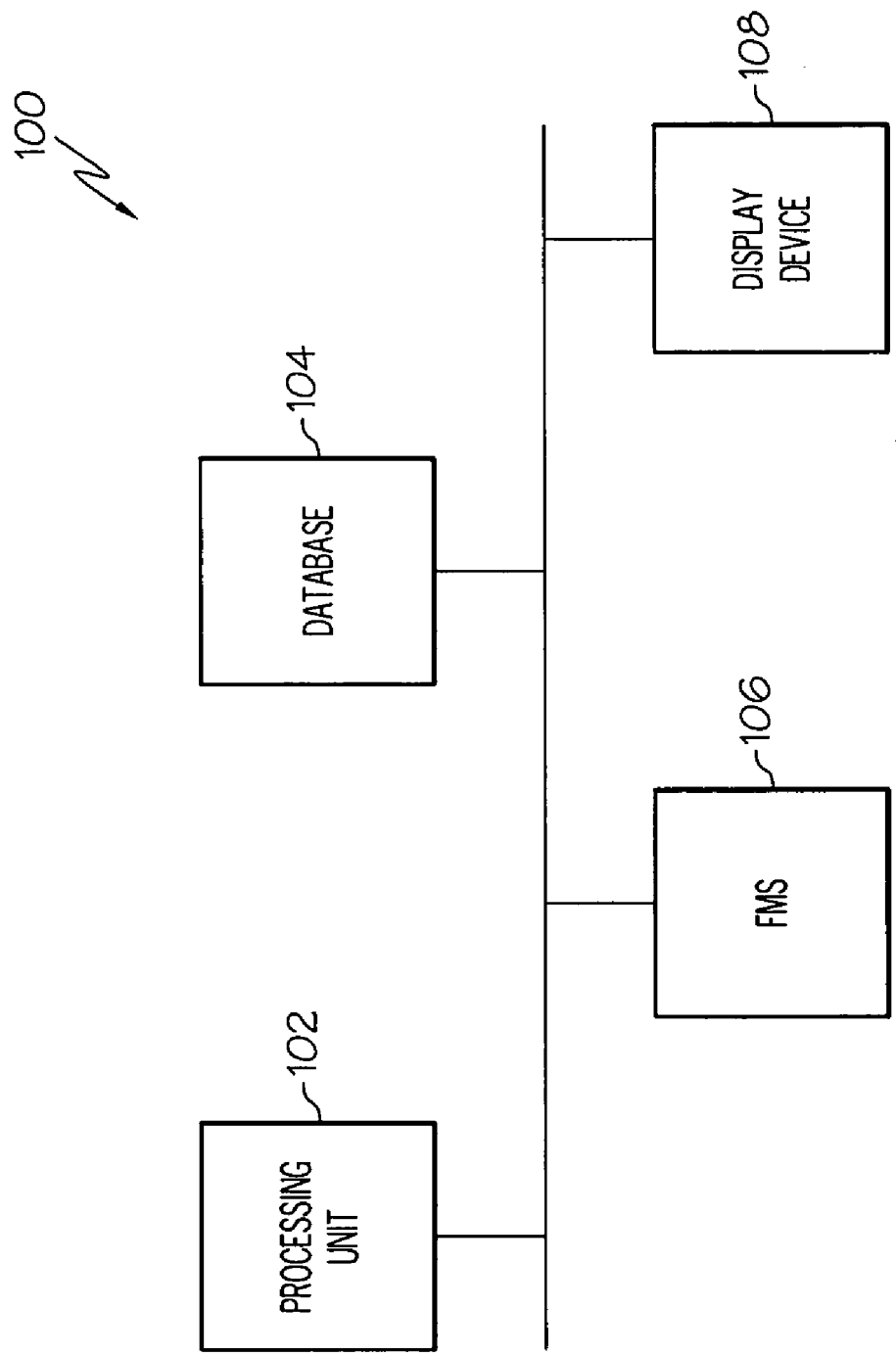
FIG. 1 is a functional block diagram of a system for displaying a touchdown point during a landing situation.

FIG. 1 depicts a block diagram of an exemplary aircraft visual display system 100 for displaying a touchdown point during a landing situation. In the exemplary embodiment shown, the system 100 includes a processing unit 102, a database 104, a flight management system 106, and a display device 108. Although the system 100 appears in FIG. 1 to be arranged as an integrated system, the system 100 is not so limited and can also include an arrangement whereby one or more of the processing unit 102, the database 104, the flight management system 106, and the display device 108 are separate components or subcomponents of another system located either onboard or external to an aircraft. Also, for example, the system 100 can be arranged as an integrated system (e.g., aircraft display system, primary flight display system, a Head Up Display with SVS or EVS as an overlay, a "near to eye display" system, or a head mounted display system, etc.) or a subsystem of a more comprehensive aircraft system (e.g., flight management system, navigation and control system, target aiming and control system, collision alert and/or avoidance system, weather avoidance system, etc.). The system 100 can be utilized in an aircraft, such as a helicopter, airplane, or unmanned vehicle. Moreover, equivalent embodiments of the system 100 can also be utilized in spacecraft, ships, submarines, fixed wing and rotor aircraft, such as helicopters, as well as other types of vehicles. For simplicity, embodiments are described below with reference to "aircraft."

The processing unit 102 can be a computer processor associated with a primary flight display. Generally, the processing unit 102 receives and/or retrieves flight management information (e.g., from the flight management system 106) and landing, target and/or terrain information (e.g., from database 104). The processing unit 102 generates display control signals for a visual display of the flight management information, which includes navigation and control symbology such as a zero pitch reference line, heading indicators, tapes for airspeed and altitude, terrain information, flight path information, RNP information, and any other information desired by a flight crew. As discussed in further detail below, the processing unit 102 additionally calculates and generates display control signals representing the touchdown point on a runway. The processing unit 102 then sends the generated display control signals to a display device (e.g., the display device 112). More specific functions of the processing unit 102 will be discussed below.

Database 104 is coupled to processing unit 102 and can be a memory device (e.g., non-volatile memory, disk, drive, tape, optical storage device, mass storage device, etc.) that can store digital landing, waypoint, and target location as either absolute coordinate data or as a function of an aircraft's position. Database 104 can also include, for example, a terrain database, which includes the locations and elevations of natural and manmade terrain. Database 104 can additionally include other types of navigation information relating to the calculation of the touchdown point, such as information relating to the aircraft and airport runways. The runway and/or taxiway data may be obtained from airports, Runway Awareness and Advisory System (RAAS), and airport mapping database (AMDB). The runway data may include, for example, the length, altitude and gradient of the intended landing runway. The runway data may also include a map of the airport, which includes data defining the runways at the airport, including the runway identifications. The runway data can be used to compare aircraft position with the distance to any of the runway boundaries, including the aircraft's height above ground in relation to a runway environment.

The aircraft data may be obtained from the Federal Aviation Administration (FAA) and aircraft manufacturers, such as from aircraft flight manual. The aircraft data may also include aircraft characteristics as a function of, for example, aircraft weight, with corrections based on, for example, wind direction, runway slope, runway surface condition, atmospheric altitude and outside temperature. The aircraft data may also include a list of manufacturer or company regulations defining various aspects of flight, particularly landing.

The flight management system 106 is coupled to processing unit 102, and can provide navigation data associated with the aircraft's current position and flight direction (e.g., heading, course, track, etc.) to the processing unit 102. The navigation data provided to the processing unit 102 can also include information about the aircraft's airspeed, altitude, pitch, and other important flight information. In exemplary embodiments, the flight management system 106 can include any suitable position and direction determination devices that are capable of providing the processing unit 102 with at least an aircraft's current position (e.g., in latitudinal and longitudinal form), the real-time direction (heading, course, track, etc.) of the aircraft in its flight path, the waypoints along the flight path, and other important flight information (e.g., elevation, pitch, airspeed, altitude, attitude, etc.). Information can be provided to the processing unit 102 by, for example, an Inertial Reference System (IRS), Air-data Heading Reference System (AHRS), and/or a global positioning system (GPS).

The system 100 also includes the display device 108 coupled to the processing unit 102. The display device 108 may include any device or apparatus suitable for displaying various types of computer generated symbols and information representing at least pitch, heading, flight path, airspeed, altitude, landing information, waypoints, targets, obstacle, terrain, and RNP data in an integrated, multi-color or monochrome form. Using data retrieved (or received) from the flight management system 106, the processing unit 102 executes one or more algorithms (e.g., implemented in software) for determining the position of the various types of desired information on the display device 108. The processing unit 102 then generates a plurality of display control signals representing this data, and sends display control signals to the display device 108. The display device 112 and/or processing unit 102 may include a graphics display generator for generating the appropriate symbology on the screen of the display device 108, as discussed in greater detail below. In this embodiment, the display device 108 is an aircraft cockpit, multi-color display (e.g., a primary flight display).

Although a cockpit display screen may be used to display the above-described flight information symbols and data, any suitable type of display medium capable of visually presenting multi-colored or monochrome flight information for a pilot or other flight crew member can be provided, such as, for example, various CRT and flat-panel display systems (e.g., CRT displays, LCDs, OLED displays, plasma displays, projection displays, HDDs, HUDs, etc.).

Figure 2:
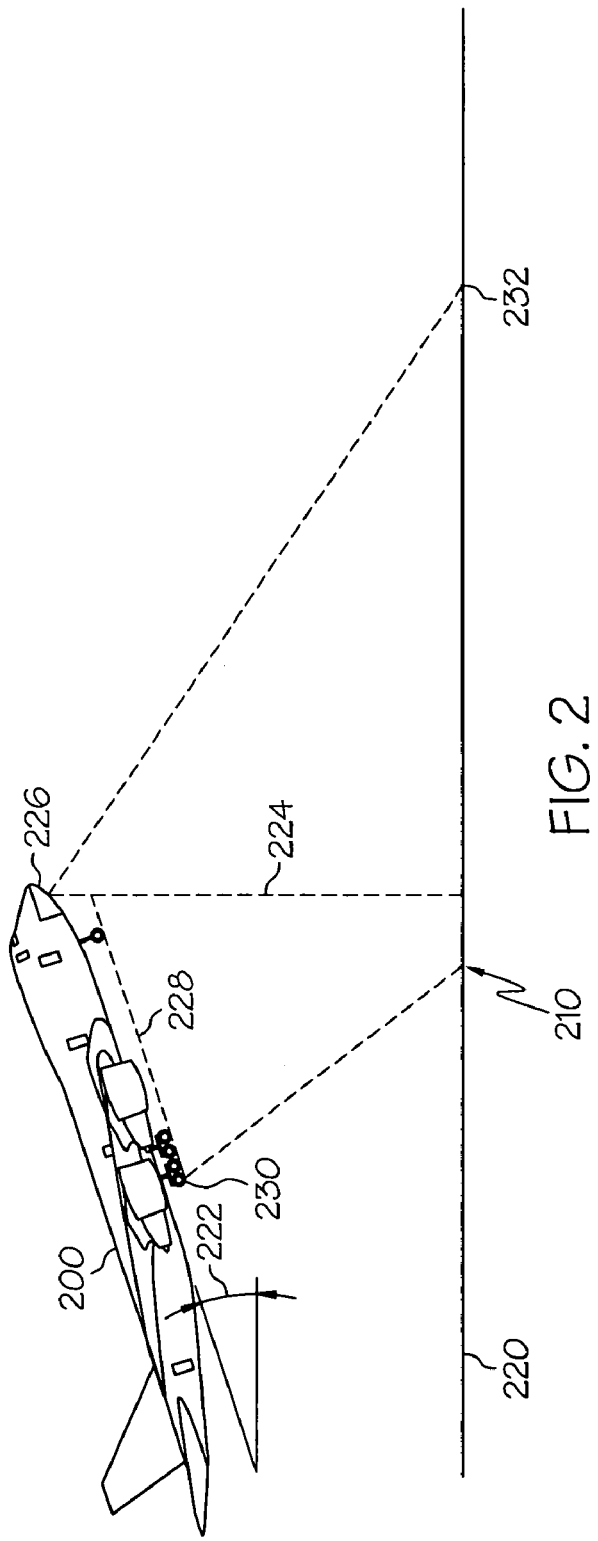
FIG. 2 is an elevation view of an aircraft during the landing situation.

FIG. 2 is an elevation view of the aircraft 200 during a landing situation, and is useful for describing the process by which the system 100 of FIG. 1 determines a touchdown point 210. FIG. 2 will be described in conjunction with FIG. 1.

In FIG. 2, the aircraft 200 is approaching a runway 220 at a pitch angle 222. In one embodiment, the FMS 106 determines a height 224 of the aircraft 200 from a GPS receiver 226, which in this example is located at the front of the aircraft 200. The processing unit 102 can then use this height 224, in conjunction with the speed of the aircraft 200, the pitch angle 222, and the distance 228 from the GPS receiver 226 to the rear wheels 230, to determine the touchdown point 210 on the runway 220. Essentially, in this exemplary embodiment, the system 100 may, in effect, construct a parallax from the apparent landing location based on the GPS receiver 226 to the actual touchdown point 210 relative to the rear wheels 230. The processing unit 102 may also consider the grade of the runway 220 when determining the touchdown point 210. Other considerations may include engine activity, drag, environmental and weather conditions, and/or any other suitable factors. Since the aircraft 200 typically executes a flare when approaching the runway 220, i.e., and the pitch angle changes, the system 100 can continually and/or periodically evaluate the position of the touchdown point 210 since it may change. The touchdown point determination may be initiated, for example, upon demand by the flight crew and/or automatically initiated based on signals from the airport.

In conventional systems, the visual display may show a flight path marker representing the direction in which the aircraft is going, and thus the apparent path at which the aircraft will touchdown. However, this flight path marker is usually from the perspective of the cockpit, and gives a touchdown point from the nose of the aircraft, such as point 232 in FIG. 2. However, the system 100 according to the exemplary embodiment more accurately determines the actual touchdown point 210 of the aircraft 200, i.e., the point at which the rear wheels 230 first touch the runway 216. Although one process for determining the touchdown point is described in association with FIG. 2, any suitable mechanism may be used. For example, a ground sensor and/or GPS receiver adjacent the rear wheels 230 may assist the system 100 in determining the touchdown point 210. Additionally, although the process described with respect to FIG. 2 discusses the touchdown point relative to the rear wheels, other types and configurations of aircraft or vehicles may be provided with touchdown points relative to other positions.

Figure 3:
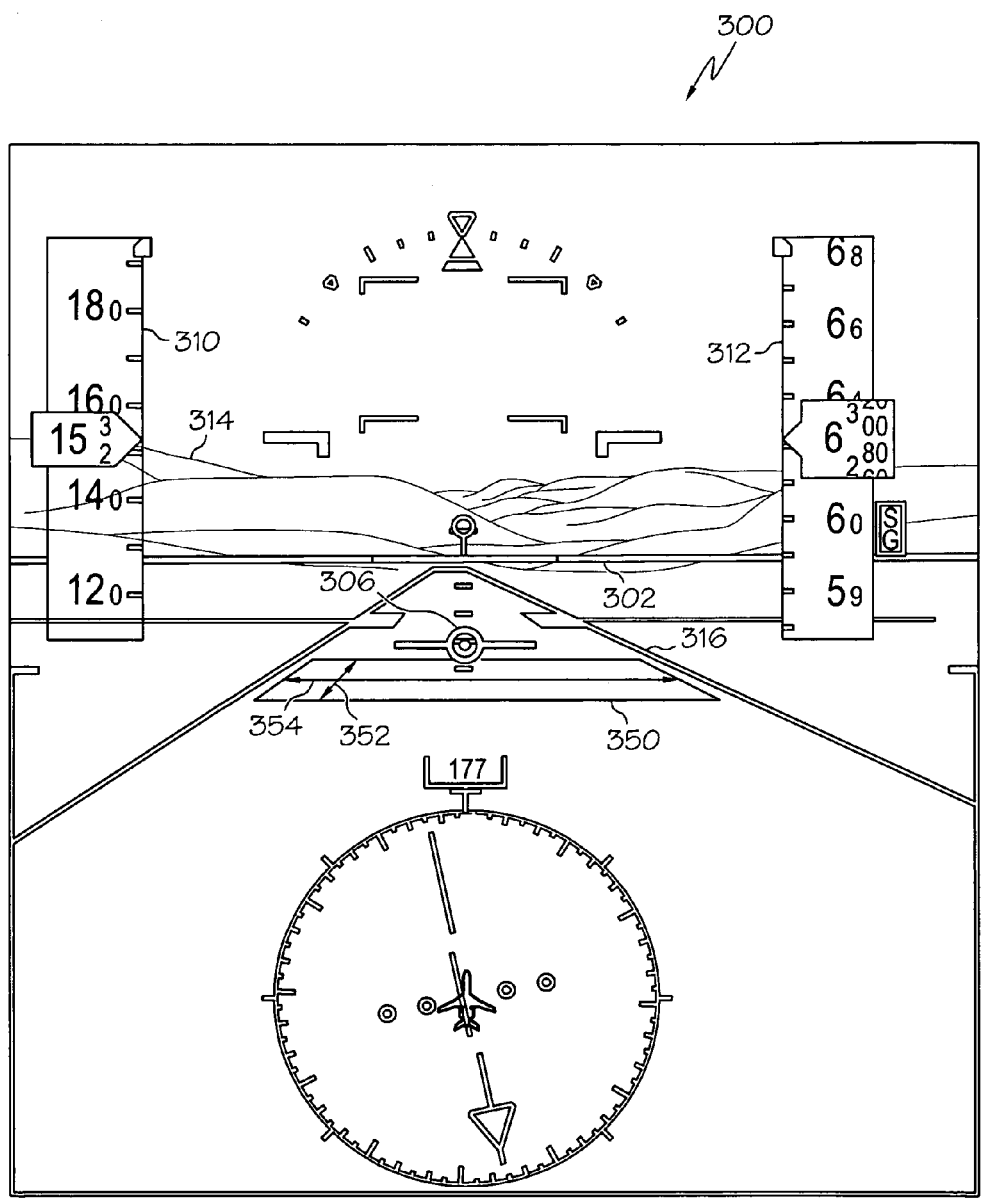
FIG. 3 depicts an exemplary visual display that may be rendered by the system of FIG. 1 during the landing situation.

FIG. 3 depicts an exemplary visual display 300 that may be rendered by the aircraft display system 100 of FIG. 1. The display 300 shows, among other things, computer generated symbols representing a zero pitch reference line (e.g., commonly referred to as a horizon line) 302, a flight path marker (also known as a flight path vector or velocity vector) 306, an airspeed scale or tape 310, an altitude scale or tape 312, and terrain 314. The display 300 of FIG. 3 additionally depicts a runway 316 during a landing approach. In this embodiment, the display 300 is rendered as a three-dimensional, perspective view. Although the display 300 is shown as an egocentric, first-person frame of reference, the display 300 can be a secondary, wingman, and/or plan or perspective view that enables a viewer to view the aircraft, as well as zoom in and out, including an unmanned vehicle and/or spacecraft. The display 300 is generally associated with a primary flight display, although the display 300 can also be utilized on a multi-function display, Head Up Display, and/or a head mounted display.

In addition, and as will now be described in more detail, the display 300 in FIG. 3 may also selectively render symbology representing a touchdown point 350 that may enhance the situational awareness of the flight crew. The location of the touchdown point 350 can be determined, for example, as discussed above with reference to FIG. 2. In this embodiment, the touchdown point 250 is rendered as a band or bar, although other embodiments may have different representations.

In the exemplary embodiment displayed in FIG. 3, the touchdown point 350 is rendered in a color different from the runway, such as for example, the color blue. The color of the touchdown point 350 may vary based on position relative to the runway 316. For example, if the touchdown point 350 is short of the runway 316 or extends past the end of the runway 316, the touchdown point 350 can be rendered in a more urgent color, such as yellow or red, to indicate a problem with the landing approach. Other colors may also be provided based on the location of the touchdown point within the runway 316. Alternatively, the touchdown point 350 may be indicated by shading, highlighting or additionally symbology.

The touchdown point 350 in this embodiment has a thickness 352 that corresponds to the thickness of the runway 316. The touchdown point 350 has a length 354 that balances accurately displaying the exact touchdown point 350 with being easily identifiable by the flight crew. A longer touchdown point 350 may be more readily identified, while a shorter touchdown point 350 provides a more exact location. The length 352 and width 354 can be adjusted as necessary by the designers and/or flight crew. In one embodiment, the length 352 can be a function of the position or speed of the aircraft. For example, at greater distances from the runway 316 or at greater speeds, the length 352 may be greater, while decreasing in length 352 as the aircraft moves closer to the runway 316 and slows down.

The touchdown point 350 provides an accurate representation of the location at which the aircraft will touchdown onto the runway 314. This may increase situational awareness for the flight crew and increase flight safety by providing important information in an advantageously intuitive location and manner.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A display system for an aircraft, comprising:
   a processing unit configured to determine a touchdown point for the aircraft and to supply display commands associated with the touchdown point; and
   a display device coupled the processing unit and configured to receive the display commands and operable to render symbology representing the touchdown point, wherein the display device is a primary flight display, wherein the aircraft includes landing gear with rear wheels, wherein touchdown point is a point at which the rear wheels touch the runway, and wherein the processing unit is configured to receive a height of the aircraft from a flight management system based on signals from a global positioning system receiver, the processing unit further configured to receive a speed of the aircraft and a pitch angle of the aircraft, and the processing unit further configured to determine the touchdown point based on the height, the speed, the pitch angle, and a distance from the global positioning system receiver to the rear wheels.

2. The display system of claim 1, wherein the processing unit is configured to periodical updates the touchdown point.

3. The display system of claim 1, wherein the display device is configured to display a 3D, synthetic view.

4. The display system of claim 1, wherein the display device is further operable to render symbology representing a runway during a landing situation.

5. The display system of claim 4, wherein the display device is operable to render the touchdown point in a first color if the touchdown point is at a first position on the runway and in a second color if the touchdown point is at a second position on the runway.

6. The display system of claim 1, wherein the display device is operable to render the touchdown point as a bar extending across the runway.

7. The display system of claim 6, wherein the display device is further configured to render the touchdown point as the bar extending across the runway at a width, the display device further configured to render the touchdown point as the bar with a variable length, the variable length based on at least one of position or speed of the aircraft.

8. The display system of claim 1, wherein the display device is operable to render the touchdown point in a color different from the runway.

9. The display system of claim 1, wherein the display device is operable to render the touchdown point in a first color if the touchdown point is on the runway and in a second color if the touchdown point is off the runway.

10. The display system of claim 1, further comprising a database configured to supply runway data to the processor, the processor configured to determine the touchdown point based on the runway data.

11. A method of displaying symbology related to a runway on an aircraft, comprising:
receiving position and elevation data associated with a first location on the aircraft, the first location being associated with a global positioning system receiver on the aircraft;
presenting a 3D perspective view of the runway;
determining a touchdown point of the aircraft on the runway based on the position and elevation data and the distance from the first location to rear wheels on the aircraft; and
displaying the touchdown point on the 3D perspective of the runway.

12. The method of claim 11, further comprising periodically updating the touchdown point.

13. The method of claim 11, wherein the displaying the touchdown point step includes displaying the touchdown point as a bar extending across the runway.

14. The method of claim 13, wherein the displaying step includes displaying the touchdown point as the bar extending across the runway at a width and further displaying the bar at a variable length, the variable length based on at least one of the position or a speed of the aircraft.

15. The method of claim 11, wherein the displaying the touchdown point step includes displaying the touchdown point in a color different from the runway.

16. The method of claim 11, wherein the displaying the touchdown point step includes displaying the touchdown point in a first color if the touchdown point is at a first position on the runway and in a second color if the touchdown point is at a second position on the runway.

17. The method of claim 11, further comprising receiving runway data, the determining step including determining the touchdown point based on the runway data.

* * * * *